United States Patent
Ditto et al.

[15] 3,699,639
[45] Oct. 24, 1972

[54] FRICTION WELDING METHODS
[72] Inventors: Edwin D. Ditto, Sandusky, Ohio; William S. Stone, Trenton, Mich.
[73] Assignee: General Motors Corporation, Detroit, Mich.
[22] Filed: Oct. 27, 1970
[21] Appl. No.: 84,424

Related U.S. Application Data

[62] Division of Ser. No. 778,720, Nov. 25, 1968, Pat. No. 3,627,189.

[52] U.S. Cl. ...................29/470.3, 156/73, 228/2
[51] Int. Cl. ..............................................B23k 27/00
[58] Field of Search ............228/2; 29/470.3; 156/73

[56] References Cited

UNITED STATES PATENTS

| | | |
|---|---|---|
| 3,234,646 | 2/1966 | Hollander et al.........29/470.3 |
| 3,349,982 | 10/1967 | Lipp et al. .....................228/2 |
| 3,501,079 | 3/1970 | Martin et al...................228/2 |
| 3,610,507 | 10/1971 | Kiwalle..........................228/2 |

Primary Examiner—John F. Campbell
Assistant Examiner—R. J. Craig
Attorney—W. E. Finken, A. M. Heiter and Charles R. White

[57] ABSTRACT

Friction welder and friction welding methods in which plural flywheels can be selectively connected to a single workpiece drive spindle at different times so that kinetic energy can be stored in one flywheel as the kinetic energy of another flywheel is being used to relatively rotate and frictionally weld two workpieces engaged under thrust load. After the workpieces are welded, new workpieces are inserted into the welder so that the energy of the second flywheel can be utilized to relatively rotate and frictionally weld the other workpieces engaged under thrust load as kinetic energy is being stored in the first flywheel for subsequent friction welding. As the workpieces are being relatively rotated, they can be slid laterally relative to each other so that all parts of the interface are cleaned and directly heated by friction. Both workpieces are rotated during welding so that a single tool can be employed to facilitate removal of hot-weld flash.

11 Claims, 16 Drawing Figures

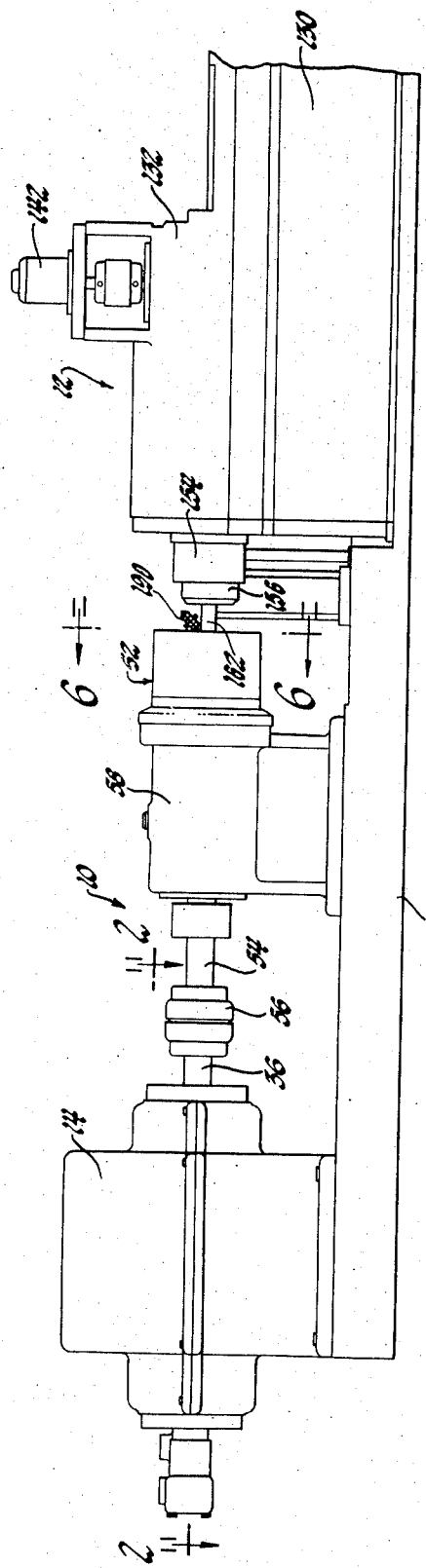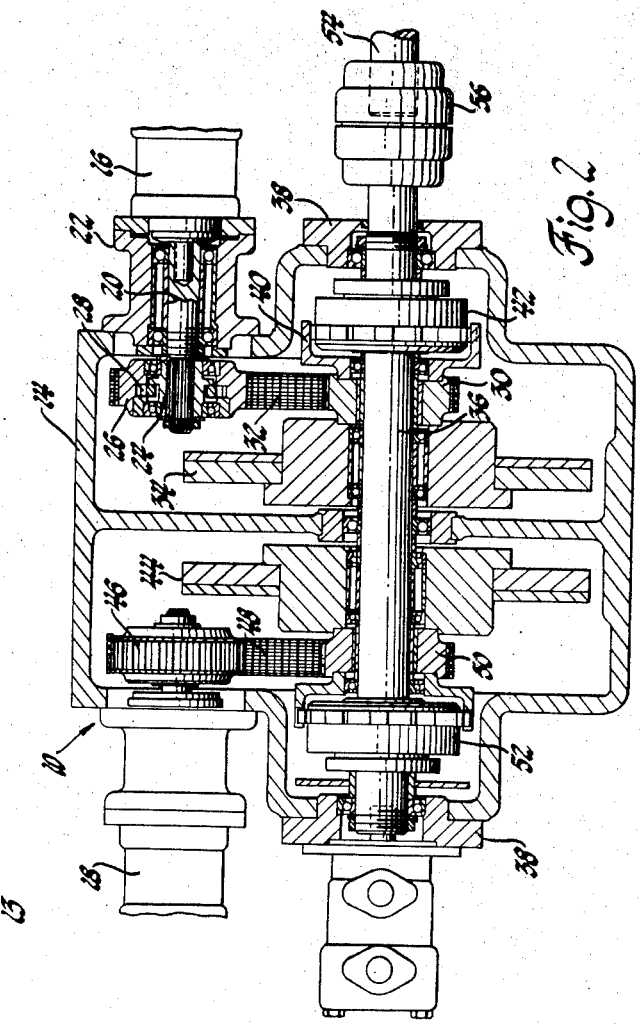

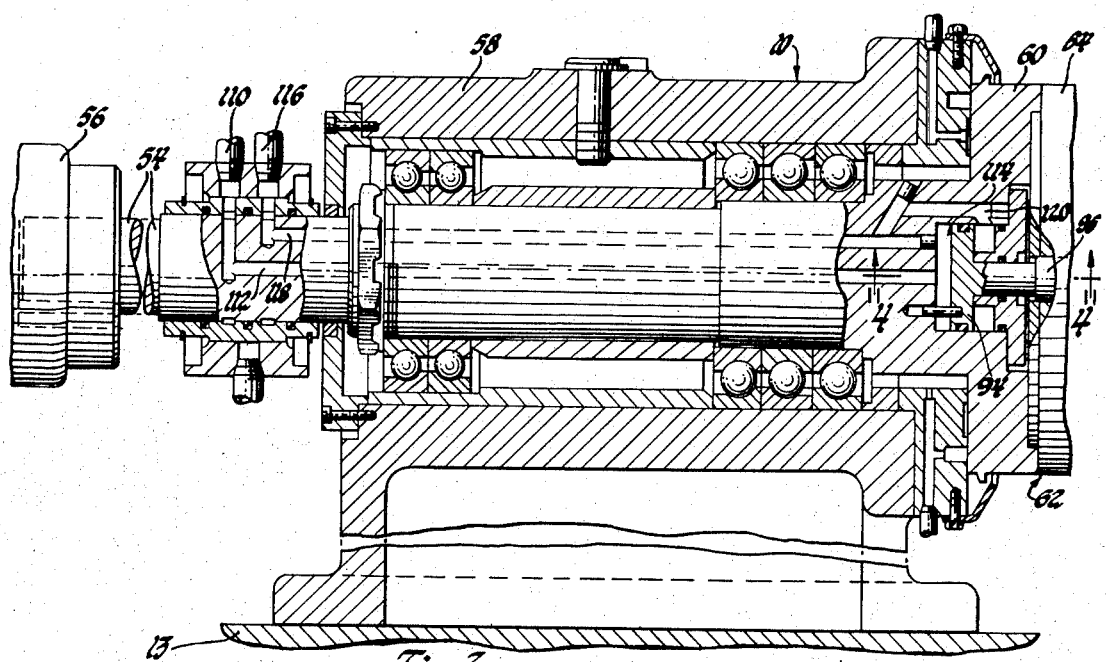
Fig.3
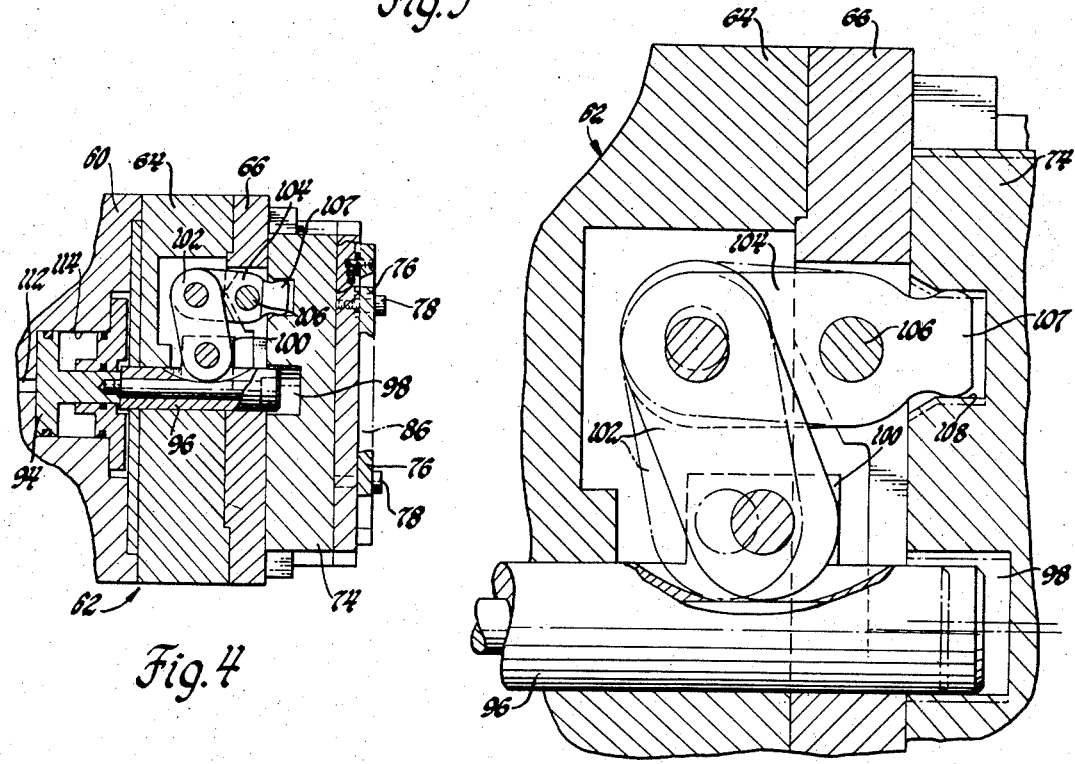
Fig.4
Fig.5
INVENTORS
Edwin D. Ditto, &
BY  William S. Stone
Charles L. White
ATTORNEY

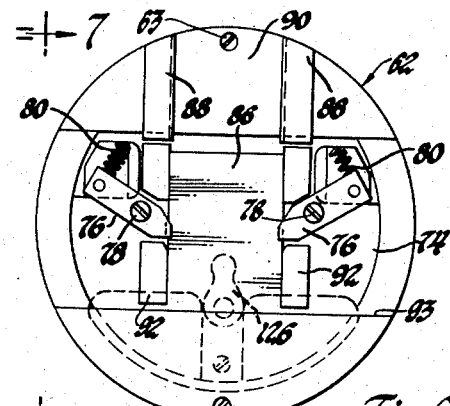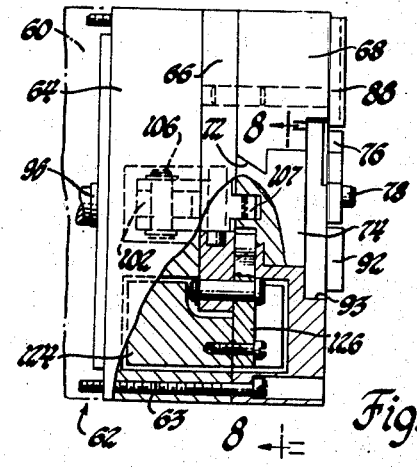

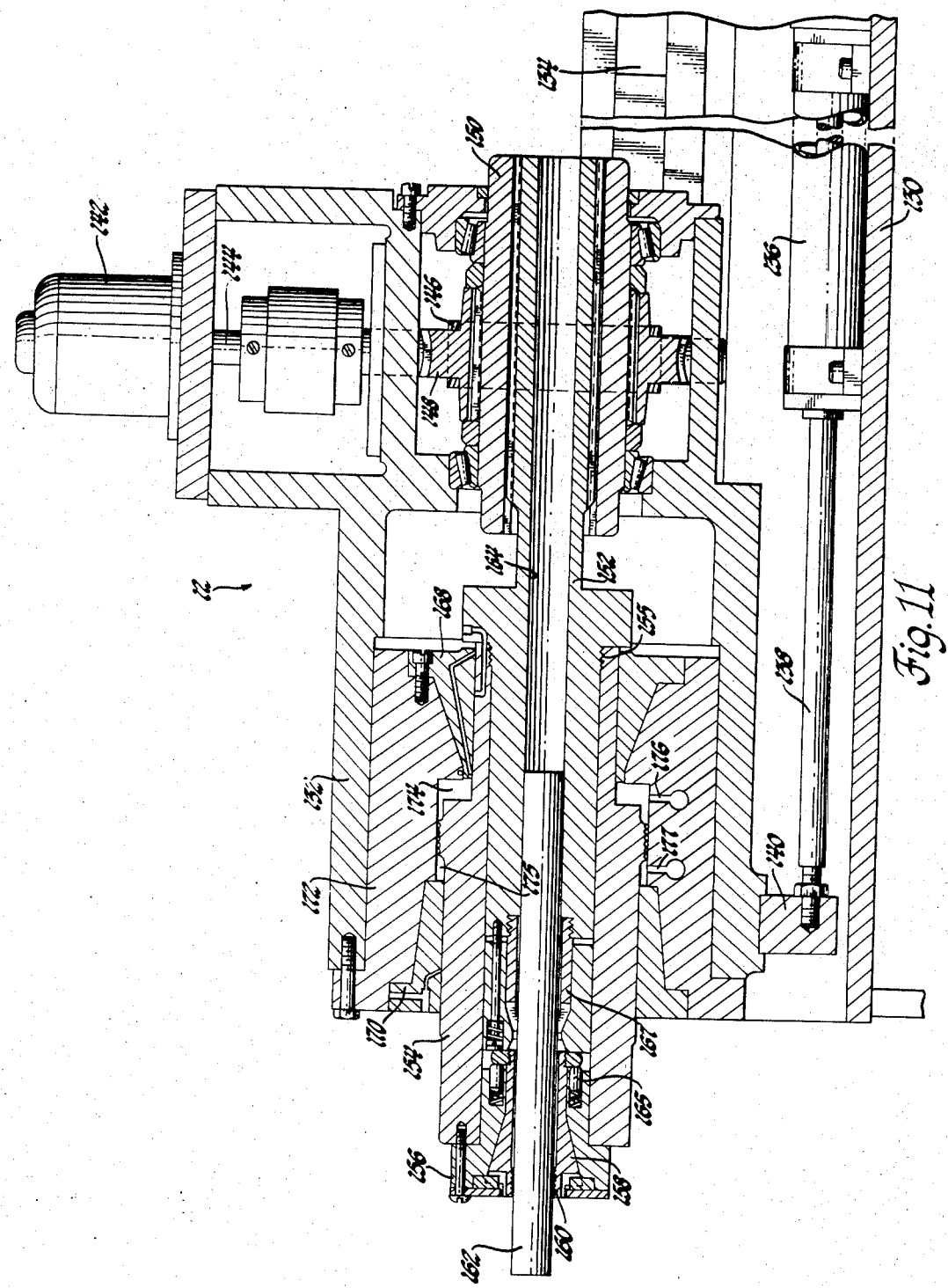

INVENTORS
Edwin D. Ditto, &
BY William S. Stone
Charles L. White
ATTORNEY

INVENTORS
Edwin D. Ditto, &
BY William S. Stone

Charles L. White

ATTORNEY

FRICTION WELDING METHODS

This is a division of application Ser. No. 778,720, entitled "Friction Welder" filed Nov. 25, 1968, now U.S. Pat. No. 3,627,189, issued Dec. 14, 1971.

This invention relates to welding and more particularly to friction welders and methods of friction welding involving separate drive systems which are alternately employed for the relative rotation of workpieces pressed into frictional engagement. This invention also involves the relative rotation of all parts of the interface of engaged workpieces for cleaning and direct heating thereof by friction and further involves the removal of hot-weld flash as workpieces are being welded together.

In many prior friction welding machines, the flywheel has been utilized to store energy which is subsequently used to relatively rotate two workpieces engaged and pressed together by an axial force. Once the flywheel has a predetermined amount of stored energy and the two workpieces are engaged at an interface, the heating and welding of the parts together can often be accomplished rapidly. However, when additional workpieces are loaded into such welders, there is an undesirable time delay before another welding operation can occur. This delay is necessary because the flywheel must be accelerated to a predetermined speed and energy level before engaging new workpieces under thrust load to effect the weld. Such machines and processes often did not meet high productivity requirements; accordingly, the utilization of these friction welders has been limited. Furthermore, the prior machines and processes do not provide for the direct heating and cleaning of all parts of the interface of the engaged workpieces by friction since there is zero velocity at the rotational axis of the workpieces and low velocity in the center area of the interface near the rotational axis of the workpieces. Under many conditions, and especially where very rapid welding is desired, this axis and center area often are not sufficiently rubbed together and heated to a plastic condition; and complete welding would not occur. Also the prior friction welding machines and processes generally made no provision for removing the flash from both workpieces, such as a cylindrical bar and flat plate, as they were being welded. In many cases flash had to be removed from one or both workpieces by grinding after the weld joint had cooled. This prior flash removal is difficult, time consuming and costly.

In the present invention, friction welding efficiency is materially improved by the use of plural motor-flywheel drives which are alternately employed to relatively rotate workpieces engaged under thrust load so that they will heat and weld together. When one motor and flywheel is being employed in a welding operation, another flywheel is being driven to a speed by a second motor for frictionally welding other workpieces as soon as they can be loaded into the machine. In a similar manner, the first flywheel is driven by the first motor to a predetermined speed as the second motor and flywheel are used to frictionally weld workpieces together. If desired, three or more motor-flywheel drive systems can be used on the same welder to further increase output.

In this invention the relative rotation and direct heating of all portions of the interface can be achieved by relatively moving the workpieces laterally at a predetermined distance as they are being relatively rotated. This provides important benefits in that all portions of the interface are directly heated to a plastic state insuring complete and more uniform welds. Also all portions of the interface including the axis of rotation are mechanically scrubbed and cleaned by sliding friction.

For removal of flash emitted from the interface during welding, this invention provides for the differential drive of both workpieces so that a flash removal tool can be employed near the periphery of the interface to mechanically cut or scrape the flash from both workpieces during a welding operation. This eliminates the requirement for an extensive grinding operation after the parts are welded.

In addition to the features, objects and benefits pointed out above, it is a further object of this invention to provide a friction welder in which a first flywheel is used to relatively rotate and frictionally heat and weld first workpieces together as a second flywheel is being driven to a predetermined rotational energy level so that the latter flywheel may be used to frictionally weld other workpieces after being loaded into a welder and engaged under thrust load.

Another object of this invention is to provide for the relatively lateral sliding of workpieces as they are relatively rotated to clean and directly heat all portions of the workpiece interface by friction including their axes of rotation during a friction welding operation.

Another object of this invention is to provide for the differential rotational drive of workpieces so that a flash removal tool can be employed to mechanically remove flash from the two parts as they are being welded together.

Another object of this invention is to provide an improved method of friction welding using a single welding machine in which a first flywheel provides at least a portion of the kinetic energy for effecting the weld of two workpieces engaged under thrust load while a second flywheel is being driven up to a predetermined energy level; and subsequently using the second flywheel for relatively rotating other workpieces to provide at least part of the kinetic energy for effecting a friction weld thereof as the first flywheel is being driven to a predetermined energy level for still another welding operation.

Another object of this invention is to provide a method of frictionally welding two workpieces in which the workpieces are moved laterally with respect to each other for a predetermined distance as they are being relatively rotated while engaged under thrust load to insure the direct frictional heating of all parts of the workpiece interface.

Another object of this invention is to provide a method in which flash is removed from both of the workpieces during friction welding.

These and other objects of the invention will become more apparent from the following detailed description and drawings in which:

FIG. 1 is a side elevation view of a friction welder.

FIG. 2 is a sectional view taken along the lines 2—2 of FIG. 1.

FIG. 3 is a sectional view of a portion of the welder of FIG. 1.

FIG. 4 is a sectional view taken along the lines 4—4 of FIG. 3.

FIG. 5 is an enlarged view of a portion of FIG. 4.

FIG. 6 is a view taken generally along the lines 6—6 of FIG. 1.

FIG. 7 is a view taken along the lines 7—7 of FIG. 6.

FIG. 8 is a view taken along the lines 8—8 of FIG. 7.

FIG. 9 is a perspective view of workpieces welded using the friction welding machine of FIG. 1.

FIG. 10 is an end view of a portion of the tail stock of the welding machine of FIG. 1.

FIG. 11 is a sectional view of the tail stock of the welding machine of FIG. 1.

Figure 12:
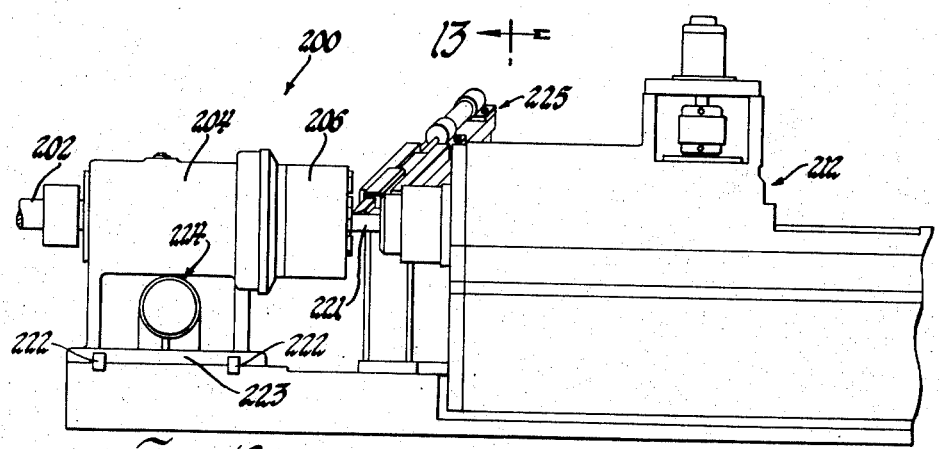
FIG. 12 is a side elevation view showing a modified form of the friction welder of FIG. 1.

Referring now in greater detail to the drawings, there is shown in FIG. 1 a friction welding machine having a headstock 10 and a tailstock 12 suitably fastened to a base 13. The headstock and tailstock are arranged in axial alignment with their drive outputs adjacent to each other. The headstock and tailstock are adapted to receive, relatively rotate and engage under axial trust load workpieces fed thereto. The heat necessary for the welding of the workpieces together is generated by the relative sliding of the two mating surfaces of the workpiece. The angular speed of relative rotation and the axial force or thrust load are selected so as to develop sufficient frictional heat at a common interface to accomplish a weld as the relative rotation of the workpieces stops. The headstock 10 has at one end a large power unit housing 14 on which drive motors such as conventional hydraulic motors 16 and 18 are mounted. FIG. 2 shows motor 16 with an output shaft keyed to a drive shaft 20 rotatably mounted by bearings in a support 22 fixed to housing 14. Drive shaft 20 extends into the housing 14 and is splined to an annular hub 24 which provides a mount for a drive gear 26. As shown, this drive gear is supported on the hub by spaced ball bearings and a one-way roller clutch 28 disposed between the hub and the drive gear 16. The one-way clutch permits the motor to drive the drive gear in one direction and allows the drive gear to overrun the motor in the drive direction.

Gear 26 is drivingly connected to a gear 30 by an endless chain 32 which meshes with the teeth of both of these gears. Gear 30 is preferably smaller than gear 26 to provide a speed-increasing drive. The driven gear 30 is secured to a flywheel 34 which is rotatably mounted on an elongated drive spindle 36 by ball bearings. This spindle extends through the housing 14 and is rotatably mounted therein by spaced support plates 38 and ball bearings. The gear 30 drives an annular hub 40 which is connected to the outer casing of a selectively engageable clutch 42. This clutch is preferably an electrically operated clutch having conventional drive plates splined to the inside of the casing and driven plates splined to the drive spindle. When these plates are engaged, the motor and the flywheel 34 will be drivingly connected to the spindle 36 and when disengaged, this drive connection will be broken.

The second drive motor 18 drives a second flywheel 44 by means of a one-way clutch, a drive gear 46, an endless chain 48 and a driven gear 50. This driven gear is also connected to the outer casing of a selectively engageable clutch 52. The construction and organization of the drive motor 18 and the associated power transmitting components to flywheel 44 and spindle 36 are the same as that described in connection with the drive motor 16 and its associated power transmitting components and further detailed description is not necessary.

The spindle 36 is drivingly connected to a second spindle 54 by a coupling 56. This second spindle extends through a second housing 58 as revealed in FIGS. 1 and 3 and is rotatably mounted therein by suitable ball bearings. The spindle 54 has at its free end a large annular flange 60 to which is fastened a head assembly 62 by bolts 63.

The head assembly (FIG. 7) includes a base plate 64, an intermediate plate 66 and a top plate 68 all connected by suitable bolts and other fasteners. The top plate has a dove tail groove 72 provided therein which slidably receives the dove tail of the cross slide 74 as best shown in FIG. 7. This cross slide carries opposed clamping jaws 76 which are pivotally mounted on the outer face of the cross slide by pivot pins 78. These clamping jaws are biased by coil springs 80 into clamping engagement with a rectangular metallic flange or workpiece 86. The outer ends of these clamping jaws are suitably tapered so that flange 86 can be removed in a longitudinal direction from the head assembly.

The top plate is formed with opposed workpiece guides 88 which provide a chute 90 for guiding the workpiece down into the cross slide into engagement with locating blocks 92 and end rest 93 provided on the cross slide. To effect the selective longitudinal sliding of the cross slide with respect to the rest of the head assembly, there is a piston 94 mounted for limited axial movement in the large end of the spindle 54.

This piston has a connected piston rod 96 which extends through the plates 64 and 66 into an enlarged opening 98 in the cross slide as shown in FIG. 4. The piston rod has an ear 100 which is pivotally connected to one end of a first link 102 of a toggle linkage. There is a second link 104 formed by spaced arms pivotally connected to the other end of link 102. This link is pivotally mounted on a pivot 106 fixed to plate 66. The second link also has a head 107 which closely fits within a recess 108 formed in the underside of the cross slide.

The piston is hydraulically operated. As shown in FIG. 3, there is a fluid conducting line 110 which is connected to an axial passage 112 in the spindle which leads into a first control chamber 114 formed in the end of the spindle and behind the piston. A second fluid-conducting line 116 is connected to a second passage 118 leading to a second control chamber 120 formed in front of the piston. When the first control chamber is supplied with pressure fluid and the second chamber is exhausted, the piston will move to the right, viewing FIGS. 3, 4 and 5 to move the cross slide to a predetermined position determined by the stroke of the piston. When the second chamber is charged and the first chamber is exhausted, the cross slide is moved back into a flange loading position in which the locator blocks on the cross slide are aligned with the guides defining the chute 90 in the top plate 68.

As shown in FIGS. 6, 7 and 8 there is a counter balance 124 located in the head assembly which dynamically balances the rotating head assembly in all positions of the cross slide and chuck. This counter balance is supported by a finger 126 which is pivoted by pin 128 to the intermediate plate 66. This finger projects into an opening 129 in the cross slide. When the cross slide is laterally moved as illustrated in FIG. 8, there will be corresponding movement of the counter balance which pivots on the pivot to compensate for cross slide position by keeping the center of gravity of the head assembly on the rotational axis of that assembly.

The tail stock 12 includes a base 130 on which a carriage 132 is slidably mounted by ways 134 shown best in FIG. 11. To move the carriage with respect to the base, there is a piston 136 which has an outer cylinder secured to base 130 by suitable fasteners. The piston rod 138 is threadedly fastened into a block 140 secured to the carriage.

The carriage 132 supports a hydraulic drive motor 142 which drives a shaft 144. This shaft has a worm gear 146 which meshes with a driven gear 148 to provide a speed reducing drive. Gear 148 is splined to an annular spindle drive 150. As shown, the spindle drive is rotatably mounted in the carriage by roller bearings and is splined to a hollow spindle 152. This spindle extends through an elongated quill 154 and is connected to this quill by screw threads 155. At the outer end of the quill there is an annular collet support 156 in which a cone shaped collet 158 is mounted. This collet is split in its head portion to provide clamping jaws 160 which receive a workpiece 162, in this instance, an elongated metallic cylindrical rod. The conical or head portion of the collet 158 provides camming surfaces which engage the conical interior walls of the collet support to permit the jaws 160 to grip the workpiece 162.

Workpiece 162 is loaded into the jaws through the axial opening 164 formed in the spindle, and spring plungers 165 urge the collet 158 and the collet support in different axial directions to provide for a light initial gripping force when the workpiece is in the position shown in FIG. 11. The annular collar member 167 is used to keep the workpiece 162 oriented and co-axial with the spindle 152 during welding. When an axial force is applied against the end of rod 162, as when it engages the workpiece flange 86, the gripping jaws will tightly grip the rod 162 by virtue of the camming of the jaws by the conical surfaces of the collet and the collet support.

The quill 154 is rotatably and slidably mounted by bearing blocks 168 and 170 in a support 172 secured to the carriage. The quill has an enlarged head portion which cooperates with the support 172 to form control chambers 174 and 175. Separate fluid conducting lines 176 and 177 form part of the hydraulic controls which lead into chambers 174 and 175 respectively. When control chamber 174 is charged with a pressure fluid and chamber 175 is exhausted, the quill and the attached drive spindle will be moved to the left; and when chamber 175 is charged and chamber 174 is exhausted, these parts will be moved to the right.

To provide additional support of workpieces after they have been welded together, an upright 180 having a rest 182 fashioned to accommodate the curvature of the cylindrical shaft, or workpiece 162 may be employed as an option. This support aids in the unloading of the welded parts when the tailstock carriage has been moved to the unloading position.

Figure 14:
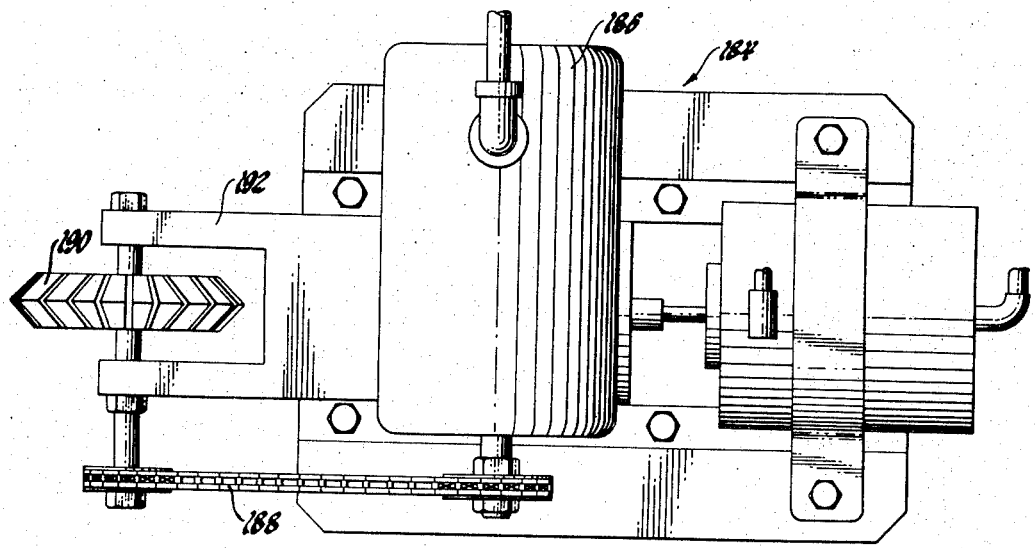
FIG. 14 is an elevation view of the flash removal tool preferably used with the welder of FIG. 1.

FIG. 14 illustrates the details of the flash removal tool assembly 184 which is used with the welder of FIG. 1. This assembly includes a drive motor and speed reduction unit 186, a belt or chain drive 188 and a cutter wheel 190 rotatably mounted on support 192 slidably positioned by piston 193. The motor rotates the cutter wheel to cut the flash squeezed from the interface during welding of the two parts together.

The metal flange or workpiece 86 is loaded into the chute 90 of the headstock head assembly which feeds the flange into the cross slide 74. As shown in FIG. 6, the blocks 92 and rest 93 locate the flange in the cross slide. Springs 80 turn the jaws 76 inwardly so that the tapered ends of the jaws overlie the edges of the flange. The flange, secured in the cross slide, is ready to be rotatably driven.

While the flange is being loaded into the cross slide, the cylinder 136 has moved the tailstock carriage to a retracted position to the right in FIG. 1. The metallic shaft or workpiece 162 is loaded into the tailstock through the cylindrical opening 164 in the spindle 152 and is positioned so that one end extends through the collet 158 as shown in FIG. 11. Spring-biased plungers 165 push the collet and head 156 in opposite directions so that the jaws 158 of the collet can grip the shaft.

Cylinder 136 is then actuated to push the carriage to the working position shown best in FIG. 11. In this position the end of the shaft 162 is close to, but not engaging, the flange 86. The motor 142 at this time is driving the spindle 152 and the shaft 162 at a predetermined speed, e.g., 200 rpm.

While the shaft is being loaded into the tailstock spindle and the carriage is being moved to the working position, the motor 16 drives the flywheel 34 up to a predetermined speed so that it possesses a predetermined quantity of kinetic energy for use in the relative rotation and welding of workpieces 86 and 162 when engaged under thrust load. After reaching a predetermined energy level, clutch 42 is engaged so that the motor and flywheel drive the flange 86 at a predetermined speed, 2500 rpm. for example. Both workpieces are driven in the same direction. Preferably motor 16 and the flywheel 34 both drive the workpieces for part of the weld cycle and then the motor is slowed down or stopped so that the flywheel is driving the flange alone with one-way clutch 28 permitting the flywheel to overrun the motor.

As soon as the motor and flywheel are driving the flange at a predetermined speed, the chamber 174 in the tailstock is charged with a predetermined pressure; the quill responds by moving longitudinally to press the end of the shaft against the flange with a predetermined thrust load. Under these conditions the sliding friction at the interface of the workpieces directly heats most of the interface area. However, at the center area of the interface, the velocity is low; and at the rotational axis of the two workpieces there is zero velocity. Heating of this center area and axis, therefore, primarily depends upon the heat conduction qualities of the material of the workpieces. This heating by conduction will not be adequate in many cases to allow high quality welding to occur in this center area. This invention overcomes this by sliding the workpieces laterally with respect to each other during the weld cycle.

To accomplish this relative lateral sliding, piston 94 is activated to move the slide 74 transversely for a short predetermined distance, preferably about one-half of the radius of the shaft. This linearly moves the rotational axis of the flange and makes a linear contact path having a width equal to the shaft diameter. Accordingly, the point at the interface which had no relative rotation is moved to a terminal point where there is relative rotation; and this point is directly heated by friction. This movement is illustrated best by FIG. 9. Also points near the rotational axis, which otherwise would have little heating by frictional rubbing, are also given higher rubbing velocities and greater direct heating by friction. This operation also ensures the cleaning of the entire interface by adequate mechanical scrubbing.

At the end of the slide movement flange 86 and shaft 162 are centered. Since all parts of the interface are cleaned and heated directly by friction, the entire interface will be heated more evenly and sufficiently to reach a plastic state to insure uniform high quality welds. The heat zone will be more uniform as compared to the prior hour-glass-shaped heat zone. While the relative sliding movement is occurring, the thrust load is maintained providing an upset force; and flash is squeezed from the interface. This removes the inclusions or impurities from the interface area. After the relative sliding is complete, the flywheel speed decays down to the speed of the shaft. Intensive plastic working of the weld being formed occurs during this deceleration to refine the grain of the weld joint. Braking of the relative rotation is by the weld formed between the two workpieces. As soon as relative rotation between the two workpieces is completed, the weld is complete and the flywheel 34 is disengaged from the spindle by release of clutch 42 while the motor of the tailstock drives both workpieces at 200 rpm while the weld joint is cooling. This rotation is in the same direction that the flange was driven by the flywheel to prevent stress in the weld joint.

During the welding operation as the slide approaches its terminal position, the cutting tool with its rotating cutter removes hot weld flash from both workpieces. The rotational drive of both workpieces permits the flash removal tool to efficiently remove hot weld flash from both workpieces simultaneously during the welding operation. If only the flange were rotating, the flash would only be removed from the flange and other flash removal methods would subsequently have to be employed to remove flash from the shaft.

After the weld has sufficiently cooled, motor 142 can be stopped if desired and the tailstock cylinder is again actuated to move the carriage to a loading position. The two workpieces being welding together will be moved with the carriage. The axial movement of the flange part of the welded workpieces acts on the cam surfaces of the jaws 76 to rotate the jaws on their pivots against the bias of their springs. This effects release of the flange of the welded workpieces from the headstock. When the carriage is at the loading station, chamber 175 is charged to effect release of the clamping jaws 160 from the workpiece 162. This occurs when the collet support 156 moves axially to the right with respect to the collet 158, releasing clamping jaws 160. The welded workpiece is then removed from the tailstock. Another flange and another shaft are then loaded into the welder in a manner as described above in connection with the workpiece 86 and 162.

While these first workpieces are being welded, motor 18 is utilized to drive the associated flywheel 44 up to speed. These new workpieces are then welded by the energy derived from motor 18 and flywheel 44 as described in connection with workpieces 86 and 162.

As the new workpieces are being welded, motor 16 again drives flywheel 34 up to the predetermined energy level to effect a third welding operation. This procedure is repeated until all workpieces have been welded.

From the above it will be clear that there is a very high output from a single welder, and the weld joint is materially improved as compared to the prior art.

Figure 13:
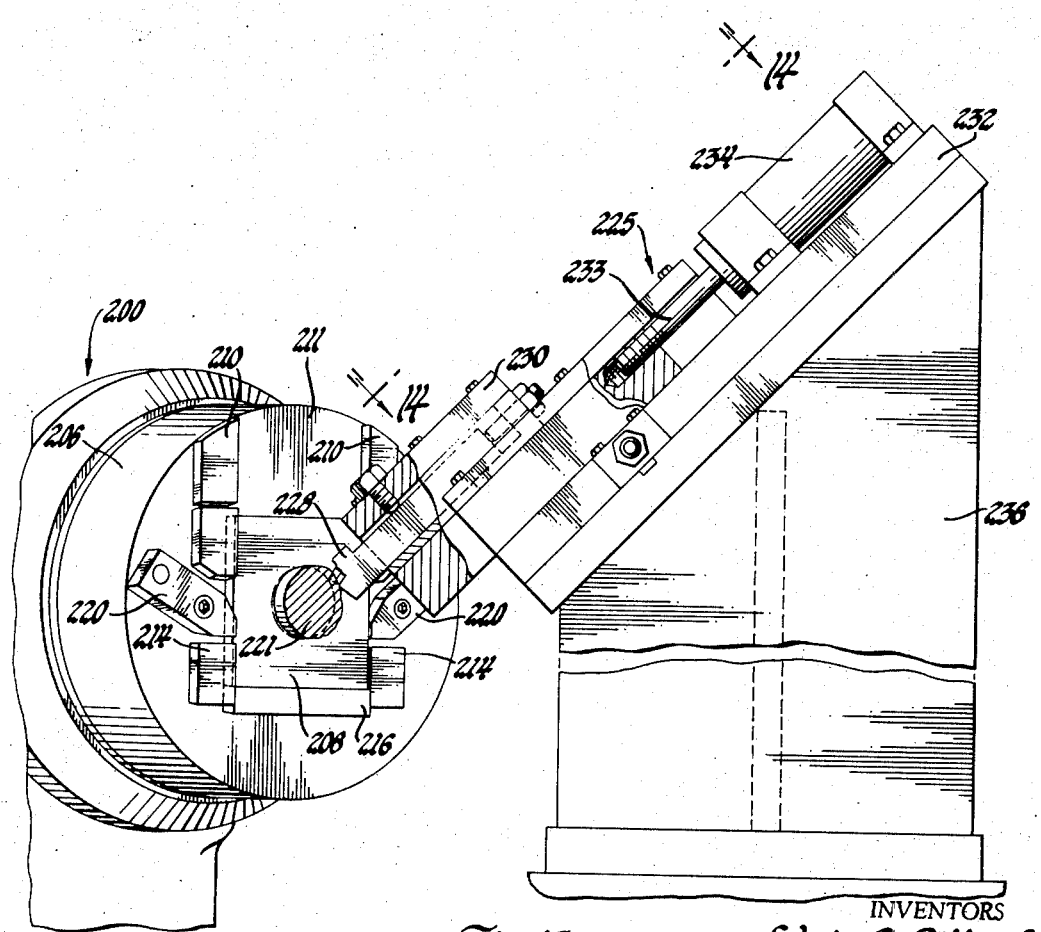
FIG. 13 is a view taken along lines 13—13 of FIG. 12.

FIGS. 12 and 13 illustrate a friction welder similar to that of the first described embodiment but which is slightly modified to provide a more concentric heating zone in the general area of the workpiece interface.

In this construction the headstock is substantially the same as the headstock of the first embodiment but the cross slide in the head assembly has been eliminated and a motor mechanism for laterally moving the whole headstock during a welding cycle has been added. With this construction a large high heat zone at the engaged faces of the workpieces will be produced by rubbing. Another variation from the first embodiment is the provision of a flash removal tool having a fixed cutting edge or tip instead of the rotating cutter of the first embodiment.

FIG. 12 shows only a portion of the headstock and tailstock, but it will be understood that the basic constructions of these parts are the same as that of the previous embodiment. The headstock 200 has spindle 202 driven by the dual motor-flywheel drive system described above. This spindle extends into a housing 204 and is drivingly connected to a head assembly 206 which receives the workpiece or flange 208. FIG. 13 shows the details of the head assembly. There it will be seen that the spaced flange guides 210 provide a chute 211 for feeding the flanges into working position established by positioning blocks 214 and rest 216. The clamping jaws 220 are like those described previously. The ends of these jaws are inclined to form cam surfaces which will cause the movement of the jaws to rotate away from the flange when it is pulled axially away from the head assembly to provide for a quick release. The headstock assembly formed primarily by the power unit housing and housing 204 have bottom slide plates 223 slidably mounted on the base by tracks or ways 222 so that the entire headstock can be moved laterally with respect to the longitudinal axis of the welder during a weld cycle. Power for this lateral movement is provided by hydraulic motors such as motor 224 which is fixed to the base and which has a piston drivingly connected to the slide plate. The power unit housing, not shown in this embodiment, is laterally slid by a similar motor mechanism. Suitable controls not illustrated are used to operate these hydraulic motors to slide the headstock as a unit between an initial and terminal position during welding as will be described. Initially the rotational axes of the headstock and tailstock and the workpieces driven thereby are offset. During a welding cycle these axes are moved into coincidence by the motors. The tailstock 212 for holding and driving shaft 221 is the same as that described in connection with the first embodiment.

FIGS. 12 and 13 also show details of the flash removal tool 225. This tool includes a fixed cutter 228 which is of carbide or ceramic fixed to slide 230. The slide is movably mounted on ways 232 and is operatively connected by rod 233 to a control cylinder 234. Movement of the slide and the attached cutter between operating and non-operating positions is by control of hydraulic fluid to the cylinder 234. The tool is mounted on a support 236 which is mounted on the floor.

Figure 15:
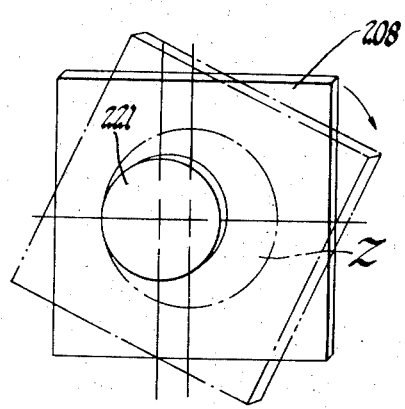
FIGS. 15 and 15A are perspective views illustrating the friction welding of workpieces using the friction welder of FIG. 12.
Figure 15A:
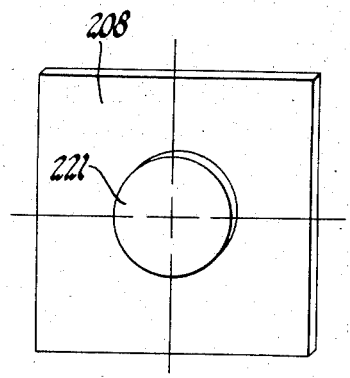

Initially the rotational axes of flange and shaft are offset, as in FIG. 15 when the parts are brought into frictional engagement. This provides a heating zone Z concentric with the center of the flange and larger than the diameter of the shaft by the amount of the offset. This offset insures that all parts of the interface are sufficiently rubbed together to a degree to provide for direct heating by friction as the whole headstock assembly is moved laterally to a final position shown in FIG. 15A; in this position the zone directly heated by friction is reduced and the rotational axis of the flange and the shaft coincide. By this method the whole interface is heated directly by friction and there is no dead spot. In all other respects the welding methods are the same as that described in connection with the previous embodiment.

Although details of preferred friction welding machines and friction welding methods have been described, they may be modified to suit particular requirements. If desired, the lateral sliding of the workpieces relative to each other may be eliminated to simplify the welder and its operation. Sufficient energy can be stored in the flywheels for friction welding of the workpieces if desired and a single motor could be employed to rotate the flywheels up to the energy levels for welding purposes. Also two different pressures may be used during each cycle if desired, an initial heating pressure and later a higher upset. Although this invention was designed primarily for welding metallic workparts, other materials such plastics can be welded with the machine and method disclosed.

We wish it to be understood that we do not desire to be limited to the exact details of construction and methods shown and described, for obvious modifications will occur to a person skilled in the art.

We claim:

1. In a method of frictionally welding workpieces together, rotating a first workpiece relative to a second workpiece, engaging said workpieces under a predetermined load so that said workpieces will heat at an interface, moving one of said workpieces relative to the other of said workpieces in a lateral direction so that different portions of the workpieces form an interface as the workpieces are being relatively rotated to thereby permit all portions of the interface including their axes of rotation to be frictionally rubbed so that they will be directly heated by friction to a plastic state, slowing the relative rotation of workpieces as the plastic material begins to cool and solidify, and stopping the relative rotation of the workpieces as the workpieces become welded to each other.

2. The method of frictionally welding workpieces together of claim 1 wherein the rotational axes of workpieces are initially misaligned by a predetermined amount, and moving the axes of the workpieces into co-axial alignment during welding.

3. The method of frictionally welding workpieces together as defined in claim 1 wherein the rotational axes of the workpieces are aligned during relative rotation and moving one of the workpieces during welding to change the center of rotation of one of the workpieces.

4. The method of frictionally welding separate workpieces together comprising the steps of: holding first and second workpieces adjacent to each other, rotatably driving a flywheel of predetermined mass to a predetermined rotary speed, rotatably driving said first workpiece relative to said second workpiece utilizing at least a part of the kinetic energy stored in said rotating flywheel, engaging the first and second workpieces at a common interface with a predetermined thrust load as they are being relatively rotated, sliding one of the workpieces from an initial to a terminal position relative to the other of said workpieces as they are being relatively rotated to permit all parts of said interface of the workpieces at the terminal position to be directly rubbed and heated by friction.

5. A method of sequentially welding workpieces together comprising the steps of: driving a first flywheel up to a predetermined speed and rotational energy level, utilizing said first flywheel to relatively rotate separate workpiece holding means and thereby relatively rotate separate first and second workpieces held thereby engaging said workpieces at a common interface with a force so that the energy stored in said first flywheel is converted into heat primarily at said interface and thereby heat the material at said interface to a plastic state while at the same time driving a second flywheel up to a predetermined speed and rotational energy level, working the plastic material at said interface as the energy stored in said first flywheel is being expended and until a bond is formed which is sufficient to stop the relative rotation of said workpieces, maintaining said force to forge said workpieces together, removing said welded workpieces from said workpiece holding means, loading separate third and fourth workpieces in said workpiece holding means, utilizing said second flywheel to relatively rotate said workpiece holding means and thereby relatively rotate said third and fourth workpieces, engaging said third and fourth workpieces at a common interface with a force so that the energy stored in said second flywheel is converted into heat primarily at said last mentioned interface and thereby heat the material at said last mentioned interface to a plastic state, working the plastic material at said last mentioned interface as the energy stored in said second flywheel is being expended and until a bond is formed which is sufficient to stop the relative rotation of said third and fourth workpieces, and maintaining said force to forge said last mentioned workpieces together.

6. A method of frictionally heating and welding workpieces together comprising the steps of: loading a first workpiece into a rotatable first chuck means and loading a second workpiece into a second chuck means so that said workpieces can be rotatably driven relative to each other, driving a first flywheel to a predetermined speed so that it stores a predetermined amount of rotational energy, drivingly connecting said first flywheel to said first chuck means to thereby rotate said first workpiece relative to said second workpiece, engaging said workpieces at a common interface and exerting a predetermined thrust load thereto to permit the energy stored in the first flywheel to be used in heating said workpieces at said interface to a plastic state and to allow the workpieces to subsequently weld together after a predetermined amount of the energy stored in the flywheel has been used in relatively rotating said workpieces, driving a second flywheel to a predetermined speed so that it stores a predetermined amount of rotational energy while the energy of the first flywheel is being used in the heating of said interface of the first and second workpieces, removing said first and second workpieces after being welded from said chuck means and said holding member, loading a third workpiece into said rotatable chuck means and a fourth workpiece into said second chuck means, drivingly connecting said second flywheel to said first chuck means to thereby rotate said third workpiece relative to said fourth workpiece, engaging said third and fourth workpieces at a common interface and exerting a predetermined thrust load thereto to permit the energy stored in said second flywheel to be used in heating said workpieces at said last mentioned interface to a plastic state and to allow said last mentioned workpieces to subsequently weld together after a predetermined amount of the energy stored in said second flywheel has been used in relatively rotating said last mentioned workpieces.

7. The method of frictionally welding separate workpieces together comprising the steps of: securing a first workpiece in a first chuck and a second workpiece in a second chuck so that said workpieces are axially spaced from each other, rotatably driving one of said chucks and the workpiece held thereby to a predetermined speed, relatively moving said chucks and the workpieces held thereby in an axial direction until said relatively rotating workpieces are engaged at a common interface under a predetermined thrust load, sliding one of the workpieces relative to the other of said workpieces for a predetermined distance in a lateral direction as they are being relatively rotated to permit all parts of said interface of the workpieces to be directly frictionally rubbed and heated to plastic condition to permit the rigid joining of said workpieces together at said interface after termination of said sliding movement and the subsequent termination of the relative rotation of said workpieces.

8. The method of friction welding defined in claim 7 and further including the steps of: initially aligning the axis of rotation of said chucks before the engagement of said workpieces and moving one of said workpieces in said lateral direction for said predetermined distance relative to said axes of rotation to thereby produce a linear path of contact between the workpieces that terminates in an interface between said workpieces which is entirely frictionally rubbed during welding.

9. The method of friction welding defined in claim 7 and further comprising the steps of: initially offsetting the axes of rotation of said chucks to provide a large circular zone heated directly by friction when said workpieces are initially engaged that is larger than the end face of one of said workpieces, and subsequently moving said axes of rotation toward alignment to diminish said circular zone to establish a terminal interface which is entirely frictionally rubbed during welding.

10. A method of frictionally welding separate workpieces together comprising the steps of: loading a first workpiece into a rotatable chuck, loading a second workpiece into a second chuck which is adapted to hold said workpiece from rotation with respect to said first workpiece, spacing said chucks and said workpieces held thereby with respect to each other, relatively rotating said chucks to a predetermined rotational speed so that said workpieces will be relatively rotated, relatively moving said chucks in an axial direction until said workpieces held thereby engage at an interface, moving one of said workpieces laterally a predetermined distance with respect to the other of said workpieces as they are being relatively rotated so that said workpieces will be heated at a terminal interface by frictional rubbing at all parts of said terminal interface, continuing said relative rotation until said terminal interface plasticizes and forms a bond to securely join and weld the workpieces together after the termination of said relative rotation of said workpieces.

11. A method of frictionally welding separate workpieces together comprising the steps of: loading a first workpiece in a rotatable and first chuck means, loading a second workpiece into a second chuck means spaced from said first chuck means, laterally offsetting the rotational axes of said first chuck means relative to the rotational axis of said second chuck means, relatively rotating said chuck means to relatively rotate said workpieces, axially moving said chuck means to engage said workpieces at an initial interface to establish a first workpiece contact zone which is greater than the area of the engaged end of one of said workpieces, laterally sliding at least one said chuck means until the rotational axis of said chuck means are in substantial alignment to thereby gradually and progressively reduce the workpiece contact zone to provide a terminal interface entirely frictionally rubbed and heated until said terminal interface plasticizes and forms a bond which rigidly joins said workpieces together.

* * * * *